(12) United States Patent
Achtzehn et al.

(10) Patent No.: US 8,658,983 B2
(45) Date of Patent: Feb. 25, 2014

(54) FAST NEUTRON SPECTROSCOPY USING NEUTRON-INDUCED CHARGED PARTICLE REACTIONS

(75) Inventors: Tobias Achtzehn, Deep River (CA); Hugh Robert Andrews, Pembroke (CA); Edward Thomas Homfray Clifford, Deep River (CA); Harry Ing, Deep River (CA); Vitali Dmitrievitch Kovaltchouk, Chalk River (CA); Alexey Voeyodskiy, Pembroke (CA)

(73) Assignee: Bubble Technology Industries Inc., Chalk River, Ontario (CA)

( * ) Notice: Subject to any disclaimer, the term of this patent is extended or adjusted under 35 U.S.C. 154(b) by 208 days.

(21) Appl. No.: 13/096,228

(22) Filed: Apr. 28, 2011

(65) Prior Publication Data

US 2011/0266451 A1 Nov. 3, 2011

(30) Foreign Application Priority Data

Apr. 29, 2010 (CA) .................................... 2702961

(51) Int. Cl.
*G01T 3/00* (2006.01)
(52) U.S. Cl.
USPC .................................................. 250/390.01
(58) Field of Classification Search
USPC ........ 250/269.6, 390.01, 390.04, 390.11, 392
See application file for complete search history.

(56) References Cited

U.S. PATENT DOCUMENTS

2007/0272874 A1* 11/2007 Grodzins ................. 250/390.11

OTHER PUBLICATIONS

Swartz, C.D., Owen, George E., Recoil Detection in Scintillators, Fast Neutron Physics, Part 1, ed. J.B. Marion and J. L. Fowler, Interscience, New York, 1960, pp. 211-246.

Cross, William G. and Ing, Harry; Neutron Spectroscopy, The Dosimetry of Ionizing Radiation, vol. II, ed. K.R. Kase, B.E. Bjarngard and F.H. Attex, Academic Press, New York, 1987, pp. 91-167.

Combes, C.M., Dorenbos, P., van Eijk, C.W.E., Kramer, K.W., Gudel, H.U.,Optical and scintillation properties of pure and Ce3+-doped Cs2LiYCl6 and Li3YCl6:CE3+ crystals, Journal of Luminescence 82 (1999), pp. 299-305.

Koroleva, T.S., Shulgin, B.V., Pedrini, Ch., Ivanov, V.Yu., Raikov, D.V., Tcherepanov, A.N., New scintillation materials and scintiblocs for neutron and y-rays registration, Nuclear Instruments and Methods in Physics Research A 537 (2005), pp. 415-423.

Boutchko, Rostyslav, Canning, Andrew, Chaundhry, Anurag, Borade, Ramesh, Bourret-Courchesne, Edith, Derenzo, Stephen E., Cerium Activated Scintillation in Yttrium Halides: First Principles Theory and Prediction, IEEE Transactions on Nuclear Science, vol. 56, No. 3, Jun. 2009, pp. 977-981.

Glodo, Jarek, Brys, Wieslaw, Entine, Gerald, Higgins, William M., van Loef, Edgar V.D., Squillante, Michael R, Shah, Kanai S., Cs2LiYCl6:Ce Neutron Gamma Detection System, 2007 IEEE Nuclear Science Symposium Conference Record; pp. 959-962.

Knoll, G., Radiation Detection and Measurement, Fast Neutron Detection and Spectroscopy, John Wiley, New York, 1979, pp. 570-586.

* cited by examiner

*Primary Examiner* — Mark R Gaworecki
(74) *Attorney, Agent, or Firm* — McDonald Hopkins LLC (57) ABSTRACT

The invention provides a method of performing fast neutron detection or spectroscopy comprising selecting at least one isotope which exhibits fast neutron-induced charged particle reactions, selecting a host medium capable of performing radiation energy spectroscopy, combining the isotope and host medium into an interactive spectroscopic combination, exposing the combination structure to radiation comprising fast neutrons to provide a spectroscopic output, which includes at least one peak in the pulse-height spectrum whose height and amplitude correlate to the energy and intensity respectively of the incident neutrons; and processing the output to detect or to provide measurements of the energy and intensity of incident fast neutron radiation. The invention also provides a fast neutron spectrometer for use with the method.

14 Claims, 6 Drawing Sheets

FAST NEUTRON SPECTROSCOPY USING NEUTRON-INDUCED CHARGED PARTICLE REACTIONS

CROSS-REFERENCE

This application claims priority to Canadian Application No. 2,702,961 filed Apr. 29, 2010.

BACKGROUND OF THE INVENTION

The present invention relates to the field of fast neutron spectroscopy, with applications in neutron dosimetry, nuclear physics, nuclear defence and counter-terrorism, and other neutron-related research.

The detection of neutrons is one of the most challenging tasks in radiation detection. There are very few physical processes that enable the detection of neutrons, especially fast neutrons (i.e. neutrons with energies greater than approximately 0.5 MeV).

Traditional Detection of Fast Neutrons

Direct fast neutron detection has traditionally relied mainly upon hydrogen recoil (the (n, p) reaction), where the neutron (n) strikes a proton (p), and the proton recoils from the reaction in a similar way that a billiard ball recoils when struck by the cue ball. Depending on the direction of recoil, the energy of the proton can range from zero (glancing hit) to the entire energy of the incident neutron (direct hit). It is the measurement of the energy of the charged proton that is used to infer the presence and energy of the uncharged neutron. Since the proton energy spans from zero to the actual neutron energy, a monoenergetic neutron produces a "distribution" of proton energies and "spectral unfolding" is required to construct a monoenergetic neutron peak (see C. D. Swartz and G. E. Owen, *Fast Neutron Physics*, Part 1, ed. J. B. Marion and J. L. Fowler (Interscience, New York, 1960) 211-246).

The hydrogen that provides the proton for neutron detection can be present in gases, liquids or solids. Hydrogen in a gaseous medium is usually deployed in "gas counters", where ionization produced by the recoiling proton is collected by an anode (under high voltage) to produce an electronic signal proportional to the proton energy. Hydrogen in a liquid medium is usually a component of a scintillation cocktail, where the energy of the recoiling proton is converted into a light pulse. The light pulse is then detected by a photomultiplier or other photon detector which gives an electronic signal proportional to the proton energy. Hydrogen in a solid medium is often used as a proton radiator. The function of the radiator is to transfer kinetic energy from a neutron to a proton ((n, p) reaction) so that the latter can be detected by a charged particle detector, such as a silicon diode or a scintillator. The output of the charged particle detector is an electronic signal whose size is proportional to the proton energy. Hydrogen can also be present in a solid scintillation crystal. The recoiling protons produce light in the scintillator and the light is converted to an electronic signal through the use of a photomultiplier or other photon detector.

In all of these detection processes, electronic processing of the signals is required to yield reasonably-sized and appropriately shaped pulses for counting by electronic scalers or for pulse-height analysis for performing neutron spectroscopy. Computer analysis is required to generate the incident neutron energy spectrum. More details on the various methods are given by Cross and Ing (W. G. Cross and H. Ing, *The Dosimetry of Ionizing Radiation*, Vol. 11, ed K. R. Kase, B. E. Bjarngard and F. H. Attex (Academic Press, New York, 1987) 91-167).

Traditional Detection of Thermal Neutrons

Sources of neutrons always produce fast neutrons. Such sources include nuclear fission (e.g. reactors), high-energy accelerators (e.g. medical linear accelerators or high-energy particle accelerators), isotopic neutron sources (e.g. $^{252}$Cf, alpha-n sources, gamma-n sources) and space radiation (e.g. cosmic rays and solar radiation). When fast neutrons interact with matter, they scatter and lose energy in the process. After a few scatters, the fast neutrons become "thermalized" in the sense that their motion is comparable to the normal motion of molecules at room temperature. For many applications, it is convenient to define thermal neutrons as those whose energy is below approximately 1 eV.

There are several isotopes that have affinity for thermal neutrons. Of particular interest are $^6$Li and $^{10}$B. These isotopes have very large absorption cross-sections for thermal neutrons and their respective reactions give rise to energetic alpha particles, whose detection is similar to and simpler than the detection of protons from hydrogen recoil. However, these isotopes are normally used merely for the detection of thermal neutrons, rather than for fast neutron spectroscopy. The reason is that their cross-sections for fast neutrons are several orders of magnitude smaller than for thermal neutrons, leading to much poorer detection efficiency.

The development of crystals containing $^6$Li or $^{10}$B for detection of thermal neutrons is the objective of many groups involved in the art of crystal growing for radiation detection applications. Combes et al (*Journal of Luminescence* 82 (1999) 299-305) prepared and studied the optical and scintillation properties of pure and $Ce^{3+}$-doped $Cs_2LiYCl_6$ crystals. Koroleva et al (*Nucl. Instr. Meth.* 537 (2005) 415-423) reviewed various scintillators for neutron measurements. R. Boutchko et al reported on work on the scintillation properties of Cerium activation in Lanthanum and Yttrium Aluminum Perovekites (*Sym, L., Nucl. Radiat. Detect. Mat., Apr.* 14-16 (2009)). J. Glodo et al (2009 *IEEE Nucl. Sci. Sym. Conf Record* N17-6) reported on the use of $Cs_2LiYCl_6$: Ce for the detection of thermal neutrons.

SUMMARY OF THE INVENTION

The subject invention provides a novel method of performing fast neutron spectroscopy by exploiting specific neutron-induced charged particle reactions in combination with a detector material capable of performing radiation energy spectroscopy. This innovative method requires an isotope which exhibits neutron-induced charged particle reactions, said isotope being chemically or physically incorporated into or surrounded by a host medium capable of performing radiation energy spectroscopy which together, when exposed to monoenergetic fast neutrons, exhibit a peak (or peaks) in the pulse-height spectrum whose energy is correlated to the energy of the incident neutrons and whose amplitude is correlated to the intensity of the incident neutrons. The preferred embodiment of this novel method involves the use of a host medium with good neutron/gamma discrimination properties and high energy resolution characteristics, in concert with an isotope with a large fast neutron interaction cross-section and with a neutron interaction cross-section which results from a unique nuclear reaction, rather than a combination of reactions.

The invention includes a method of performing fast neutron detection or spectroscopy comprising selecting at least one isotope which exhibits fast neutron-induced charged particle reactions, selecting a host medium capable of performing radiation energy spectroscopy, combining the isotope and host medium into an interactive spectroscopic combination, exposing the combination structure to radiation comprising fast neutrons to provide a spectroscopic output, which includes at least one peak in the pulse-height spectrum whose height and amplitude correlate to the energy and intensity respectively of the incident neutrons; and processing the output to detect or to provide measurements of the energy and intensity of incident fast neutron radiation.

The invention also includes a fast neutron spectrometer comprising an interactive combination of at least one isotope selected to exhibit fast neutron-induced charged particle reactions, and a host medium capable of performing radiation energy spectroscopy; and means to process the radiation-induced output of the combination to detect or to measure incident fast neutron radiation.

Any isotope that exhibits neutron-induced charged particle reactions would be operative. Each isotope may span a different useful range of neutron energies. Isotope examples include, but are not limited to: $^{35}$Cl, $^{14}$N, $^{24}$Mg, $^{28}$Si, $^{29}$Si, $^{31}$P, $^{32}$S, $^{39}$K, $^{43}$Cu etc.

The invention will work as long as there is some amount of isotope present. However, as the content of the isotope decreases, so does the sensitivity of the fast neutron detection.

The host medium can be any material that is capable of performing radiation energy spectroscopy. Examples of possible host media include but are not limited to scintillators (such as CLYC, NaI, LaBr$_3$ etc.), as well as solid-state detectors (such as Si diodes, Germanium, CdTe, and CZT etc.). A scintillator is a material that gives off light or luminescence when radiation interacts with it. A solid-state detector generates electron-hole pairs when radiation interacts with it, which can then be measured as an electrical signal.

DETAILED DESCRIPTION

Scintillation crystals developed for the detection of thermal neutrons via the $^6$Li and $^{10}$B reactions can be used for the detection of fast neutrons if they contain Cl. The reactions in Cl are not currently the ones of interest to the crystal growers—Cl happens to be one of the elements in the crystals that contain the desired elements Li and B. However, we have found that the Cl reactions, in particular $^{35}$Cl(n, p), yield a very important characteristic of these crystals, because they permit high-resolution fast neutron spectroscopy, which is much more important for neutron detection than merely the detection of thermal neutrons.

Figure 1:
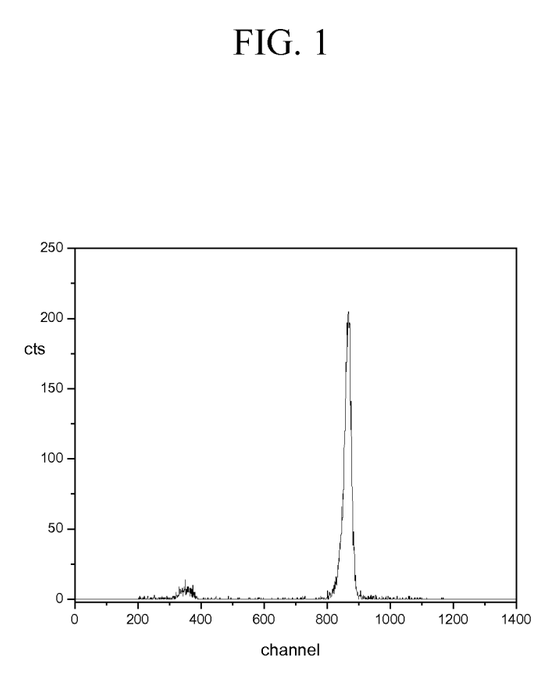
FIG. 1 shows the pulse-height distribution from a CLYC detector irradiated by 893 keV neutrons.

FIG. 1 illustrates the essence of our discovery. It shows the pulse-height distribution from a Cs$_2$LiYCl$_6$:Ce (CLYC) scintillator irradiated by 893 keV monoenergetic neutrons, produced using a Van de Graaff accelerator. The peak at about channel 850 is due to thermal neutrons. Such neutrons are from the scattering of the 893 keV neutrons in the materials in the room including floors, walls, etc. This is the common peak of interest that is typically used for thermal neutron detection applications. The peak that we wish to exploit is the peak to the left, at around 350 keV. Our analysis has shown that this peak is due to the $^{35}$Cl (n, p) reaction induced directly by 893 keV neutrons. The reason it is lower in pulse height than the "thermal" neutron peak is because the $^6$Li (n, α) $^3$H reaction for thermal neutrons has a positive Q value of 4.64 MeV, and this energy is imparted to the reaction products, giving them much energy to produce ionization.

Figure 2:
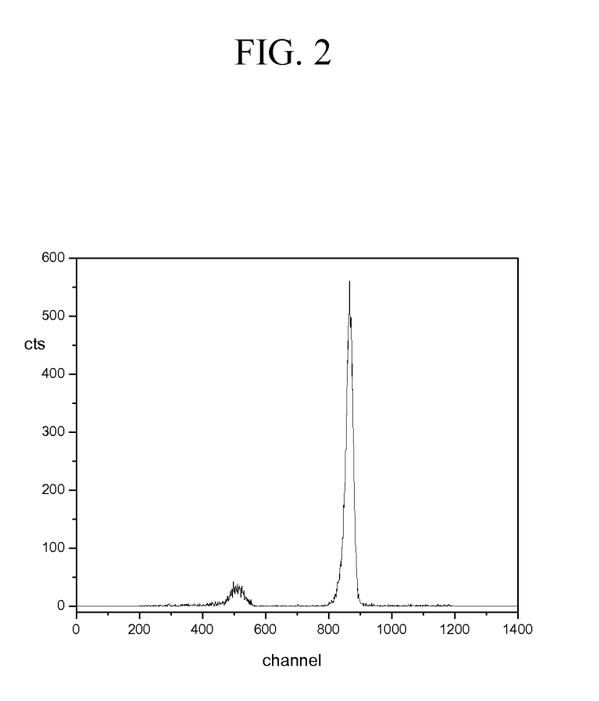
FIG. 2 shows the pulse-height distribution from a CLYC detector irradiated by 1508 keV neutrons.
Figure 3:
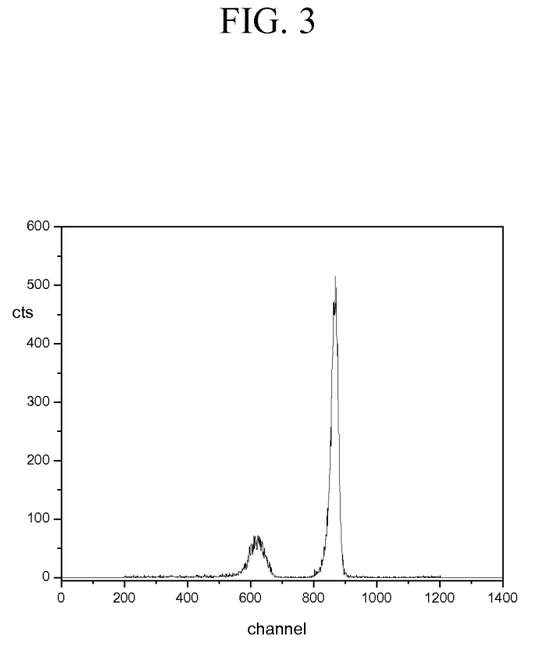
FIG. 3 shows the pulse-height distribution from a CLYC detector irradiated by 1913 keV neutrons.

On the other hand, the $^{35}$Cl (n, p) reaction has a Q value of only ~615 keV and the reaction products derive their energy from this and from the kinetic energy of the incident fast neutron. A positive Q value indicates that energy is added to a reaction; a negative Q value requires outside energy to induce a reaction. FIGS. 2 and 3 show the corresponding data for CLYC irradiated by 1508 keV and 1913 keV monoenergetic neutrons, respectively.

The three spectra shown are quite "clean" in the sense that there are no other interfering peaks due to other background radiation such as gamma rays. This is due to the fact that the electronic signals have been pre-processed using pulse-shape analysis, which rejects signals that are not due to neutrons because of their different pulse shape (rise time).

Figure 4:
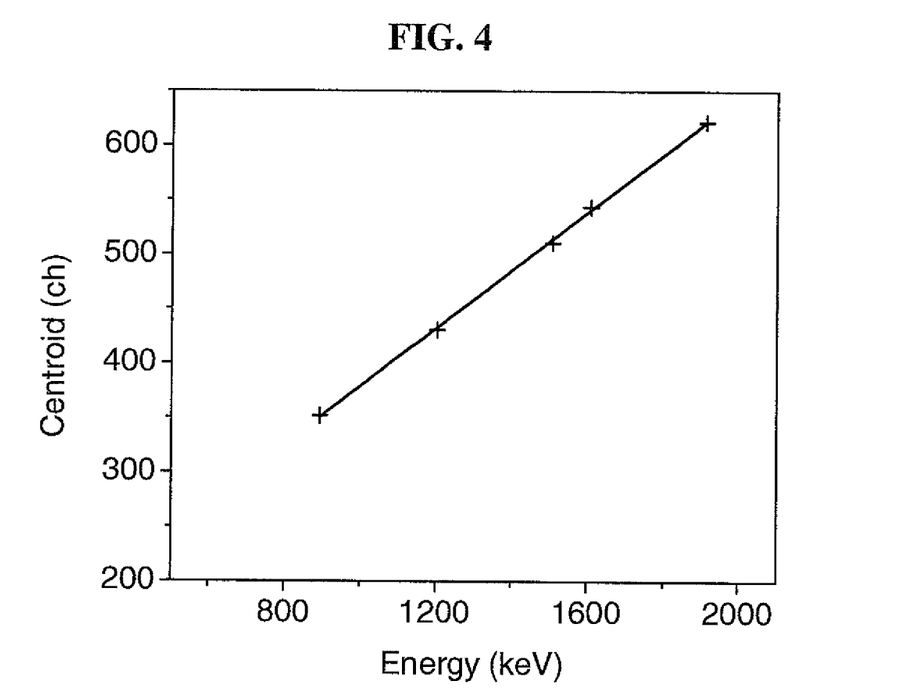
FIG. 4 shows the location of the $^{35}$Cl(n,p) peak with neutron energy.

It should be noted that the thermal peak remains at a fixed location on the spectrum while the lower peak from $^{35}$Cl (n, p) moves to a higher channel as the incident neutron energy increases. FIG. 4 shows the plot of location (channel number) of the $^{35}$Cl (n, p) peak versus incident neutron energy. The linear relationship shows the suitability of this phenomenon for applications in neutron spectroscopy.

Figure 5:
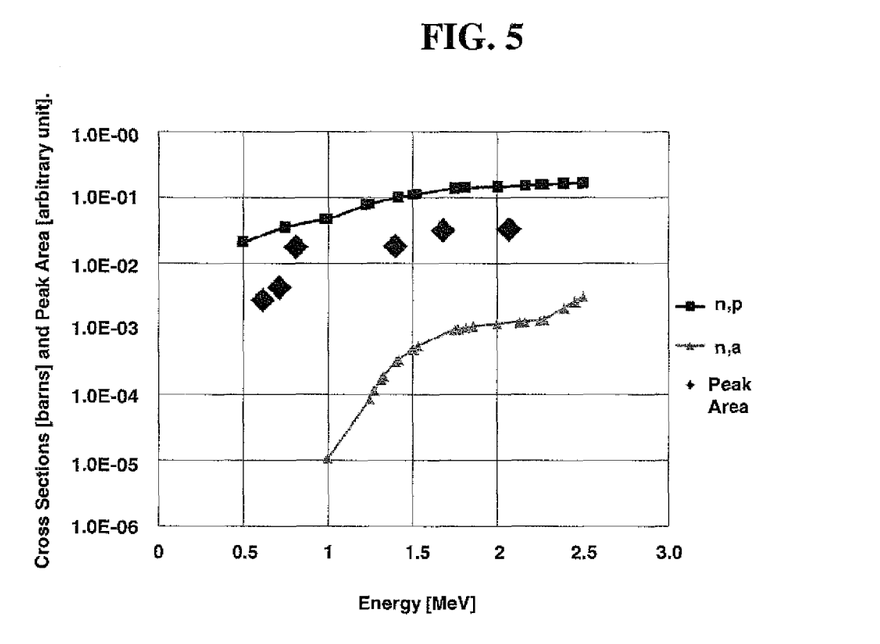
FIG. 5 shows the comparison of the strength of the $^{35}$Cl(n, p) peak with the $^{35}$Cl(n,p) and $^{35}$Cl(n, alpha) cross-sections.

FIG. 5 compares the strength of the $^{35}$Cl (n, p) peak, for the same incident fluence of neutrons at different energies, with the known $^{35}$Cl (n, p) cross-section as well as the $^{35}$Cl (n, alpha) cross-section. The experimental data show the same shape as the $^{35}$Cl (n, p) cross-section, which confirms the correct attribution of the peak to the $^{35}$Cl (n, p) reaction.

Figure 6:
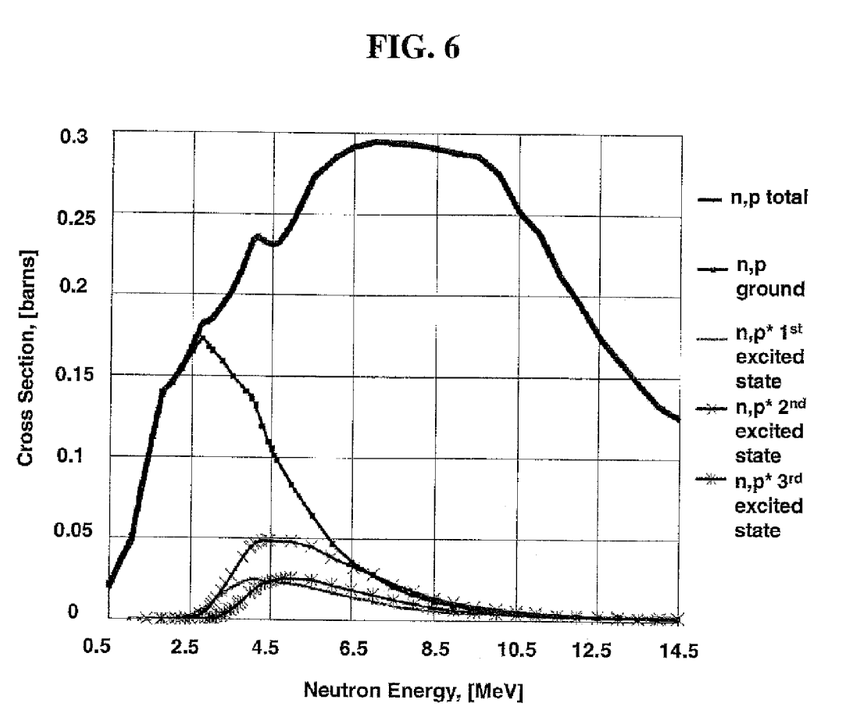
FIG. 6 shows the cross sections of $^{35}$Cl (n,p) reactions leading to different states of the residual nucleus.

FIG. 6 shows the $^{35}$Cl (n,p) cross sections responsible for the observed effect. Below about 2.5 MeV, the $^{35}$Cl (n,p) peak is due entirely to a reaction that leads to the ground state of the residual nucleus and monoenergetic incident neutrons give rise to a single peak, so almost no computer analysis (i.e. spectral unfolding) is required to interpret the measured results. Above 2.5 MeV, there are competing reactions from the higher states of the residual nucleus that will lead to smaller peaks (due to smaller cross-sections) much lower in the pulse height spectrum. For spectral measurements, these lower peaks must be taken into account as part of the response function for these higher energy incident neutrons. In the region around 3.8 MeV, the thermal peak from $^6$Li (n, alpha) (see FIG. 1) can interfere with measurements using the $^{35}$Cl (n,p) reaction. However, this interfering peak can be removed (if desired) by surrounding the CLYC scintillator with a thermal neutron absorber, e.g. a centimeter of $^{10}$B$_4$C. Then the $^{35}$Cl (n,p) reaction in CLYC can be used to measure neutrons spectroscopically from about 0.5 MeV to over 6.0 MeV.

A fast neutron spectrometer can be created by placing e.g. the CLYC in contact with the front face of a photon detector, such as a photomultiplier, photodiode, avalanche photodiode or silicon photomultiplier, which is a conventional arrangement. The usual methods of pulse-height analysis and pulse-shape neutron/gamma discrimination are then applied to the output signal of the photomultiplier (see e.g. G Knoll, *Radiation Detection and Measurement* (John Wiley, New York, 1979) 570-586). The pulse-height distribution of the neutron-induced signals can then be measured, as shown in FIGS. 1 to 3. The analysis of the $^{35}$Cl (n,p) peak enables fast neutron spectroscopy to be performed, which can identify monoenergetic or distributed spectrum neutron sources. In addition, it enables the development of compact fast neutron spectrometers with high energy resolution. This new capability is important for many neutron research studies and for radiation protection involving unknown and hazardous neutron fields encountered in various work environments.

The invention claimed is:

1. A method of performing fast neutron detection or spectroscopy comprising:
   a) selecting at least one isotope which exhibits fast neutron-induced charged particle reactions,
   b) selecting a host medium capable of performing radiation energy spectroscopy,
   c) combining the isotope and host medium into an interactive spectroscopic combination,
   d) exposing the combination structure to radiation comprising fast neutrons to provide a spectroscopic output, which includes at least one peak in the pulse-height spectrum whose height and amplitude correlate to the energy and intensity respectively of the incident neutrons; and
   e) processing the output to detect or to provide measurements of the energy and intensity of incident fast neutron radiation.

2. The method of claim 1 wherein the isotope in a) is at least one of the group consisting of $^{35}Cl$, $^{14}N$, $^{24}Mg$, $^{28}Si$, $^{29}Si$, $^{31}P$, $^{32}S$, $^{39}K$ and $^{43}Cu$.

3. The method of claim 1 wherein the host medium b) is one of: a scintillator and a solid-state radiation detector.

4. The method of claim 1 wherein the isotope is $^{35}Cl$ and the host medium is a scintillator of the type $Cs_2LiYCl_6$:Ce (CLYC).

5. The method of claim 1 wherein the host medium is selected to have good neutron/gamma discrimination and high energy resolution.

6. The method of claim 1 wherein the isotope a) has a large fast neutron interaction cross-section.

7. The method of claim 1 wherein the reactions in a) include a single unique nuclear reaction.

8. The method of claim 1 wherein the isotope concentration in the combination is selected to give the desired sensitivity.

9. The method of claim 1 wherein the reaction in a) is of the (n,p) type or the (n,α) type.

10. A fast neutron spectrometer comprising:
    a) an interactive combination of
       1) at least one isotope selected to exhibit fast neutron-induced charged particle reactions, and
       2) a host medium capable of performing radiation energy spectroscopy; and
    b) means to process the radiation-induced output of a) to detect or to measure incident fast neutron radiation.

11. The spectrometer of claim 10, wherein the host medium is selected to have good neutron/gamma discrimination and high energy resolution properties.

12. The spectrometer of claim 10, wherein the isotope is selected to have a large fast neutron interaction cross-section resulting from a single unique nuclear reaction.

13. The spectrometer of claim 10, wherein b) includes a photon detector or charged particle detector.

14. The spectrometer of claim 13, wherein the photon detector is selected from the group consisting of a photomultiplier, photodiode, avalanche photodiode, or silicon photomultiplier.

* * * * *

UNITED STATES PATENT AND TRADEMARK OFFICE
CERTIFICATE OF CORRECTION

PATENT NO. : 8,658,983 B2  Page 1 of 1
APPLICATION NO. : 13/096228
DATED : February 25, 2014
INVENTOR(S) : Tobias Achtzehn et al.

It is certified that error appears in the above-identified patent and that said Letters Patent is hereby corrected as shown below:

On the Title Page, Item (75) Inventor, delete "Alexey Voeyodskiy" and insert --Alexey Voevodskiy--

Signed and Sealed this
Third Day of June, 2014

Michelle K. Lee
*Deputy Director of the United States Patent and Trademark Office*